United States Patent [19]
Maris

[11] Patent Number: 5,341,677
[45] Date of Patent: Aug. 30, 1994

[54] METHOD OF AERODYNAMIC STALL-TURBULENCE INDICATION

[76] Inventor: John M. Maris, 6 Lakeview Crescent, Cold Lake, Alberta, Canada, T0A 0V2

[21] Appl. No.: 979,794

[22] Filed: Nov. 20, 1992

[51] Int. Cl.$^5$ .............................................. G01M 9/00
[52] U.S. Cl. ........................................ 73/147; 340/966
[58] Field of Search .................... 73/147, 178 R, 180; 340/962, 966

[56] References Cited

U.S. PATENT DOCUMENTS

| | | | |
|---|---|---|---|
| 3,079,105 | 2/1963 | Raspet | 340/966 |
| 3,868,625 | 2/1975 | Speigner et al. | 340/966 |
| 4,061,029 | 12/1977 | Fletcher et al. | 340/962 |
| 4,188,823 | 2/1980 | Hood | 73/147 |
| 4,435,695 | 3/1984 | Maris | 340/966 |
| 4,563,684 | 1/1986 | Maris | 340/966 |
| 4,618,856 | 10/1986 | Antonazzi | 340/966 |
| 4,649,387 | 3/1987 | Maris | 340/966 |
| 4,727,751 | 3/1988 | Holmes et al. | 73/147 |

FOREIGN PATENT DOCUMENTS 1210504 8/1986 Canada .................................. 354/18

Primary Examiner—Richard E. Chilcot, Jr.
Assistant Examiner—William L. Oen
Attorney, Agent, or Firm—Robert W. B. Dailey

[57] ABSTRACT

Method, apparatus, and sensor mast for airfoil aerodynamic performance monitoring are based on pressure measurement. Pressure transducers mounted within the sensor mast measure real-time pressure, to produce an output signal. The signal is separated into steady state and overlaid ripple components. The steady state component corresponds to the mean dynamic pressure of the airflow, while overlaid ripple component corresponds to the superimposed turbulent flow component. The overlaid ripple component is transformed to an amplitude equivalent. A dimensionless ratio of the two components forms a pressure turbulence intensity factor, which may be used consistently to predict and warn of imminent stall conditions. Pressure measurement was found to be an improvement over airspeed measurement. Pressure sensors proved more robust and less fragile than airspeed sensors.

14 Claims, 17 Drawing Sheets

METHOD OF AERODYNAMIC STALL-TURBULENCE INDICATION

This invention relates to an aerodynamic performance monitor (airflow investigating apparatus) and methods of monitoring airflow. Aerodynamic performance monitors are capable of analyzing and displaying in real time the effects of boundary layer transition, flow separation, Critical Angle of Attack and Critical Mach Number. These airfoil phenomena demarcate critical aircraft performance, handling quality, and safety margin boundaries. There is presently no commercial device capable of defining these limits under varying conditions of airfoil contamination and normal acceleration. Further, the reliance on multiple sensors to generate stall warnings at the critical angle of attack, overspeed warnings at the critical Mach number, and contamination warnings in icing conditions, guarantees that the three warnings will not be valid in combination. For example, even though an ice detector has sensed the presence of ice on an airfoil, there is no intrinsic way for this information to be passed to the angle of attack measuring system; in fact neither sensor may actually be mounted on the airfoil. The result is that the stall warning will function at an incorrect angle of attack for the prevailing icing conditions. Numerous aircraft crashes have occurred for this reason alone. In a similar fashion overspeed warnings cannot compensate for normal acceleration, and aircraft performance systems cannot compensate for the sometimes significant effects of rain. The present invention envisages pressure measuring means, located at a predetermined location relative to an airfoil, means to convert pressure measurements into two distinct electrical signals representing steady-state (steady flow component) and unsteady (an overlaid ripple component corresponding to turbulent flow component) air pressures, and means to compare the electrical signals as a dimensionless number indicative of airflow separation or abnormality. The present invention similarly envisages a method of measuring airflow pressure, converting airflow pressure measurements into two distinct electrical signals representing steady-state and unsteady (overlaid ripple) air pressures, and comparing the electrical signals as a dimensionless number indicative of airflow separation or abnormality.

Although the invention will be described and referred to specifically as it relates to pressure measuring means, means to convert pressure measurements into two distinct electrical signals representing steady-state and unsteady (overlaid ripple) air pressures, means to compare the electrical signals as a dimensionless number indicative of airflow separation or abnormality, and methods of measuring air pressure, conversion of these pressure measurements into two distinct electrical signals representing steady-state and unsteady (overlaid ripple) air pressures, comparison of the electrical signals as a dimensionless number indicative of airflow separation or abnormality, it will be understood that the principles of this invention are equally applicable to similar systems and methods, and accordingly, it will be understood that the invention is not limited to such systems and methods.

BACKGROUND OF INVENTION

Airflow immediately adjacent to, and influenced, by the airfoil is called the boundary layer. Airflow at the base of the boundary layer is in contact with the airfoil and not moving relative to it, by convention the 'top' of the boundary layer is the outer limit, not literally its 'top' as opposed to 'bottom'. The airflow gradually increases in speed until it reaches the free-stream velocity at the limit of the boundary layer. The boundary layer includes two types of air flow: steady-state (smooth) and turbulent (overlaid ripple). Steady flow is generally maintained near the leading edges of an airfoil, transforming to turbulent flow further aft. The boundary layer transition has a strong influence on airfoil lift and drag characteristics, and significant changes can be caused by light wetting of the airfoil surface (by rain or de-icing fluid, for example). The transition point is a mathematical function of Reynold's Number, which is impractical to present in real-time. At high angles of attack the boundary layers starts to separate from the airfoil, usually from the trailing edges first, leaving a region of turbulent separated flow. As this region of flow separation becomes more widespread, the airfoil suffers a significant reduction in lift coefficient and is said to "stall".

Airfoils generally produce increased lift as the angle to the relative airflow increases up to a limit called critical angle-of-attack (often called the stalling angle). Under ideal conditions, this critical angle-of-attack is constant, and has led to the use of fuselage mounted angle-of-attack (AoA) transmitters to apprise the pilot of airfoil performance. Numerous accidents have proved the AoA data is invalid when airfoil icing, leading edge contamination, miss-set lifting devices (flaps, slats, and the like), or airframe damage are present, which influence the critical angle-of-attach. Conventional stall warning systems cannot function during take off, because the wing's AoA is set geometrically by the aircraft's undercarriage during the ground roll. These systems start to function during the take off rotation, when stall margins are at their slimmest, yet airspeed is too high for a safe abort. In summary, the critical AoA information is most likely to be compromised, distorted or erroneous, under the very conditions that this information is most required.

At high speeds just above the normal cruising speed of a modern airliner, the Critical Mach Number (Mcrit) is reached, where the fastest local airflow around the airfoil first reaches sonic velocity. As Mcrit is exceeded shock waves form which significantly affect the aircraft's performance and flying qualities. These effects are a joint function of Mach Number and angle-of-attack. The common provision of Machmeter and AoA indicators to the pilot, does not provide any clear indication of the combined effect of these factors, as there is no simple way for the pilot to synthesize the relationship between the two to accurately predict the onset of compressibility effects on flight manoeuvrability.

The boundary layer transition, critical angle of attack, and critical Mach Number effectively define the performance limits of any airfoil, which have the common feature of varying degrees of turbulent flow which may be measured by instant invention.

PRIOR ART

U.S. Pat. Nos. 4,435,695, 4,563,684, and 4,649,387 and Canadian Patent 1,210,504, which are hereby incorporated by reference, to the present invention describe related devices, in these the air velocity or air speed is measured by constant temperature hot wire probes, and the resulting input electric current measures speed directly. The current has a DC component corresponding to average airflow speed and a much smaller AC component corresponding to turbulence level. The components are not directly convertible to aircraft speed in feet/second, knots, miles/hour, or kilometers/hour, nor are they directly comparable to each other. The components are electrically separated, then converted from analog to digital form separately by an analog to digital converter. These digital outputs are not linear and require further processing before comparison to produce a dimensionless number relating the AC input transformed to RMS (root mean square) velocity of the AC turbulent component to the DC average component. This dimensionless number can be calibrated against actual performance at any suitable location on any given aircraft to provide a stall warning or investigatory system.

Unfortunately while providing adequate indication of turbulence level, it did not prove practical. The constant temperature hot wire probes were essentially laboratory test devices, which proved far too fragile to survive routine aircraft operations and maintenance, despite being effective in a controlled test environment.

It is an object of the invention to provide an improved practical aerodynamic performance indicator for airfoils. It is a further object to provide an improved practical method of measuring an aerodynamic performance indicator. It is a subsidiary object to measure air pressure and compare average and fluctuating air pressure components to give dimensionless indicators of aerodynamic performance. It is a further subsidiary object to provide practical means and methods to measure air pressure adjacent an airfoil in flight. Other objects will be apparent to those skilled in the art from the following specification, appended claims and accompanying drawings.

DESCRIPTION OF THE INVENTION

The quantitative relationship between pressure, velocity, density and temperature, in unsteady three-dimensional flow is extremely complex, and can be solved using numerical methods only under very specific circumstances. There was no simple transformation that could be applied between velocity-based and pressure-based turbulence parameters. For this reason a NASA Small Business Innovative Research (SBIR) grant was obtained to validate the pressure-based turbulence parameter derivation. Phase I of the grant, of approximately $50,000 was used to validate the solid-state pressure transducers on a Lockheed T33 aircraft. It was noted these could be replaced by laser sensors or a number of similar technologies to measure air pressure directly, as the actual measured pressure values are utilized in the monitor. It is possible that temperature or density sensors could be used to measure air pressure indirectly. These latter systems would require considerable research to achieve viable hardware and software algorithms.

Tests on a Piper PA 30 aircraft at the USAF Test Pilot School concluded that high response, sensitive pressure transducers had the sensitivity and frequency response required.

A NASA Small Business Innovative Research (SBIR) Phase II grant of approximately $450,000 was obtained for further testing and development. The pressure transducers were further evaluated on a test aircraft, a Saberliner business jet, with a clean wing, and simulated contamination present. The results showed good correlation between a wing contamination and sensor output. Impending stall conditions were accurately predicted.

The next stage comprised wind tunnel tests, which demonstrated that the turbulence ratio (R) derived from the pressure sensor transducer system was a good indicator of airfoil lift coefficient and stall margin, even with various forms of simulated ice attached to the airfoil.

The last phase of testing was conducted with a Cessna 421B, modified with the airflow performance monitor and a data recording system. Once again, the new methodology and hardware consistently yielded accurate stall margin data under a variety of simulated and natural icing conditions.

In one broad aspect the invention is directed to an improved method of investigating airflow over the external surface of an airfoil. The method comprises measuring at least one parameter of the airflow in real-time to produce a signal. The real-time steady state component of the signal, and the real-time overlaid ripple component of the signal are separately identified and measured. The components of the signal are expressed as a dimensionless ratio, to produce a turbulence intensity factor. The improvement provides measuring the pressure of the airflow. Preferably the real-time overlaid ripple component of the signal is transformed into an amplitude equivalent, typically its root mean square equivalent. Preferably the pressure turbulence intensity factor is presented by conventional means, such as AOA indicators, indexer lights, AOA tone generators, stick shakers and pushers and overspeed warnings. A preferred method includes measuring the real-time pressure of the airflow using pressure transducer means to produce an output signal. This pressure transducer output comprises a steady state component corresponding to the mean dynamic pressure of the airflow, and an overlaid ripple component corresponding to the turbulent component of the airflow. The output signal is analog in nature and may comprise varying voltage, resistance or current flow depending on the type of transducer and amplifier employed. The output signal is then transformed from an analog signal to a digital signal, which is then separated into steady state and overlaid ripple components, which may be also preferably scaled at this point. Typically a dedicated digital processor, or a computer using appropriate software is utilized. Typically the digital ripple component is transformed into an amplitude equivalent, which may desirably correspond to the root mean square value of the ripple component. The amplitude equivalent of the ripple component and the steady state component are expressed as a dimensionless ratio to produce a pressure turbulence intensity factor. The output signal may be amplified, and the pressure turbulence intensity factor presented by conventional means, such as AOA indicators, indexer lights, AOA tone generators, stick shakers and pushers and overspeed warning.

Alternatively the analog output signal is electrically separated into steady state and overlaid ripple components. Typically high-pass and low-pass filters can be used to separate the components which may be also preferably scaled at this point. The steady state component is DC, while the overlaid ripple component is AC. The overlaid ripple component is transformed into an amplitude equivalent, generally the root mean square (RMS) DC equivalent of the AC ripple. The amplitude equivalent of the overlaid ripple component and the steady state component are expressed as a dimensionless ratio to produce a pressure turbulence intensity factor. Preferably the analog output signal is amplified and the pressure turbulence intensity factor presented by conventional means, including but not limited to AOA indicators, indexer lights, AOA tone generators, stick shakers and pushers and overspeed warnings.

Additional levels of processing can be employed to enhance signal quality. For example spurious signals, generated by propellers, airfarme interactions, or aircraft electrical equipment can be eliminated by notch filters tuned to the undesirable characteristic frequencies. System response can be optimized through lead and lag filtering (rate anticipation and time averaging respectively). Finally the R value (pressure turbulence intensity factor) can be determined using linear, logarithmic or exponential functions, with logical constraints as required.

In another broad aspect the invention is directed to an apparatus for investigating airflow over the external surface of an airfoil. The apparatus provides means to measure pressure in real-time at a predetermined location above the surface, means to produce at least one output signal corresponding to the pressure, means to separate the signal into steady state and overlaid ripple components, and means to derive a dimensionless ratio of the overlaid ripple component and the steady state component to produce a pressure turbulence intensity factor. Preferably means to transform the real-time overlaid ripple component of the signal into an amplitude equivalent are also provided. More preferably conventional means to present the ratio are present including but not limited to AOA indicators, indexer lights, AOA tone generators, stick shakers and pushers and overspeed warnings.

This apparatus conveniently includes means to measure pressure in real-time at a predetermined location spaced from the surface, means to produce at least one output signal corresponding to the pressure, means to convert the output signal from analog to digital, means to separate the digital signal into steady state and overlaid ripple components, means to transform the overlaid ripple component into an amplitude equivalent, and means to derive a dimensionless ratio of the amplitude equivalent of the overlaid ripple component and the steady state component to produce a pressure turbulence intensity factor. Preferably means to amplify the output signal are provided and conventional means to present the ratio are present including but not limited to AOA indicators, indexer lights, AOA tone generators, stick shakers and pushers and overspeed warnings.

Alteratively the apparatus may comprise means to separate said analog output signal electrically into steady state and overlaid ripple components, means to transform said overlaid ripple component into an amplitude equivalent, means to derive a dimensionless ratio of amplitude equivalent of said overlaid ripple component and said steady state component to produce a pressure turbulence intensity factor. Preferably means to amplify said output signal and conventional means to present the ratio are present including but not limited to AOA indicators, indexer lights, AOA tone generators, stick shakers and pushers and overspeed warnings.

In practice a low pass filter to elimated frequencies above approximately 10 KHz, a lag filter to smooth the display (but not the recorded data) together with two logical constraints (an air/ground sensing switch and a low speed cutoff to eliminate nuisance warnings at very low airspeeds) were incorporated into the apparatus. A logarithmic plot of pressure turbulence intensity factor (R) versus angle-of-attack was also generated, to better quantify the fundamental response of the system. Also means to filter undesirable frequencies or to transform the signal may be included using for example lead, lag, high-pass, notch and low-pass filters. The calculated ratio (R, pressure turbulence intensity factor) is output to conventional equipment, such as AoA indicators, indexer lights, AoA tone generators, stick shakers and pushers and overspeed warnings. Other conventional means either analog or digital may be employed as would be understood by those skilled in the art to indicate R value or to warn of limiting critical R values.

In a further broad aspect the invention is directed to an apparatus for investigating airflow over the external surface of an airfoil comprising mast means for mounting on the airfoil. The mast means has leading and trailing edge means and a cross section of aerodynamic shape, pressure transducer means are mounted within the mast means. The mast means may be mounted horizontally with a vertical cross section of aerodynamic shape, or vertically with a horizontal cross section of aerodynamic shape. Preferably the mast means comprises means to maintain the leading edge means at constant temperature, including heating means within the mast means controlled by temperature measuring means adjacent to the leading edge means, whereby the leading edge means is maintained at constant temperature. The mast means may comprise orifice means in the leading edge means, and pressure transducer means mounted therein. The orifice means may include an array of spaced apart orifices in the leading edge means, at least one of the spaced apart orifices having pressure transducer means mounted therein. The mast means additionally may comprise base means attachable to the airfoil. The pressure sensors are conveniently inclined downward and above the axis of the orifice(s) to prevent direct impingement of precipitation. Vent or drain means to prevent accumulation of precipitation are also conveniently included.

BRIEF DESCRIPTION OF THE DRAWINGS

Experimental details and preferred embodiments are indicated in the drawings where.

DESCRIPTION OF THE DRAWINGS INCLUDING PREFERRED EMBODIMENTS

The general description of the invention is now expanded by reference to the drawings, which illustrate experimental details and preferred embodiments of the invention. Dimensions given below as those skilled in the art will be aware are for the purposes of illustration only, and not by way of restriction.

Figure 1:
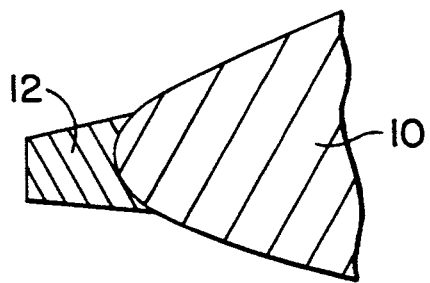
FIGS. 1 to 3 show sectional views of simulated ice conditions tested within the Ohio State University 7×10 ft. low speed wind tunnel.
Figure 2:
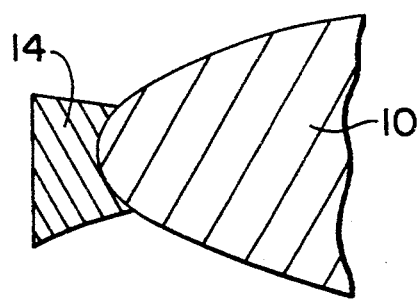
Figure 3:
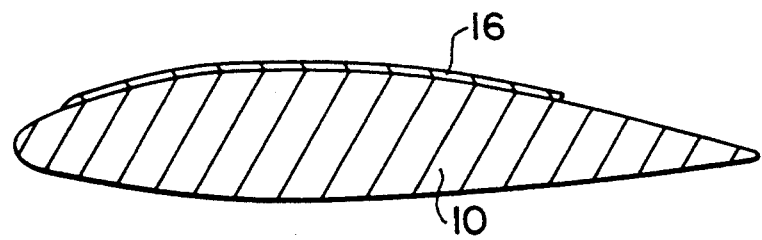
Figure 4:
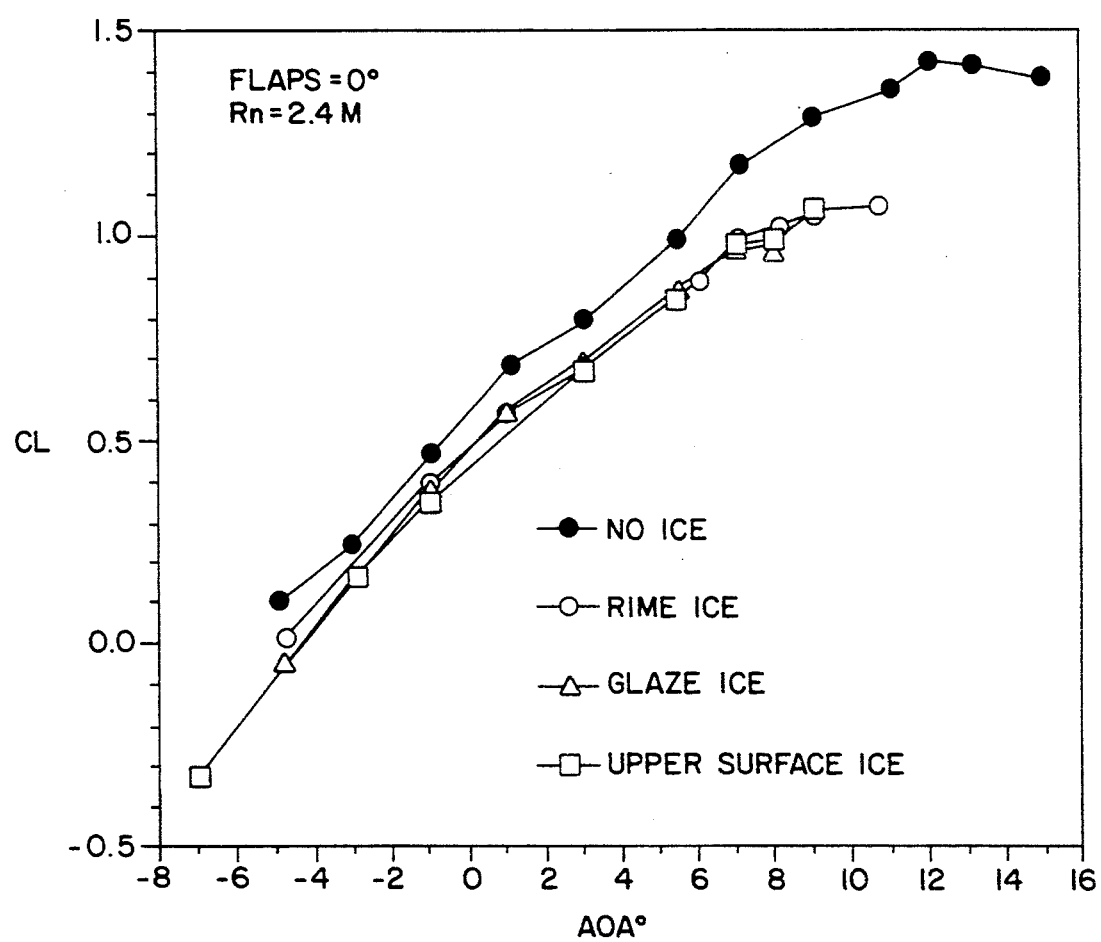
FIGS. 4 to 12 present graphically test results obtained from the Ohio State University 7×10 ft. low speed wind tunnel.
Figure 5:
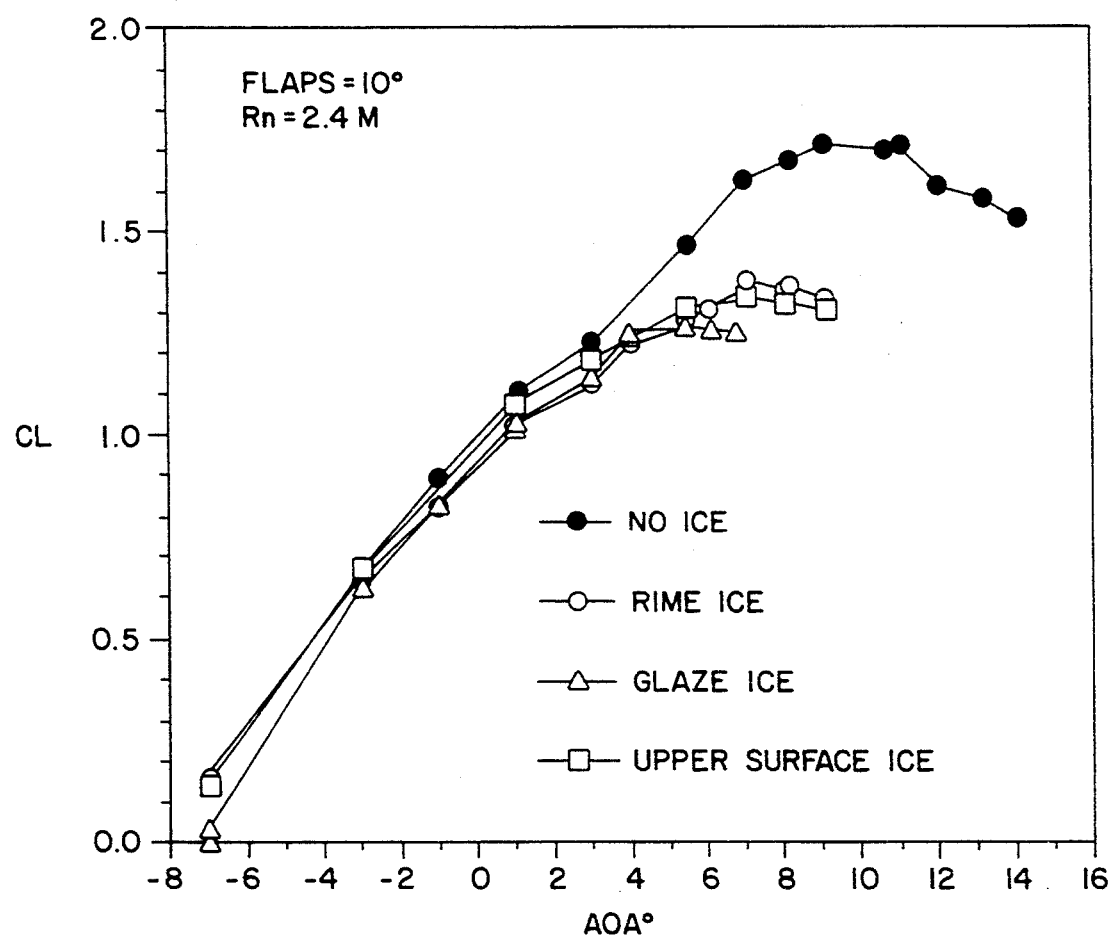
Figure 6:
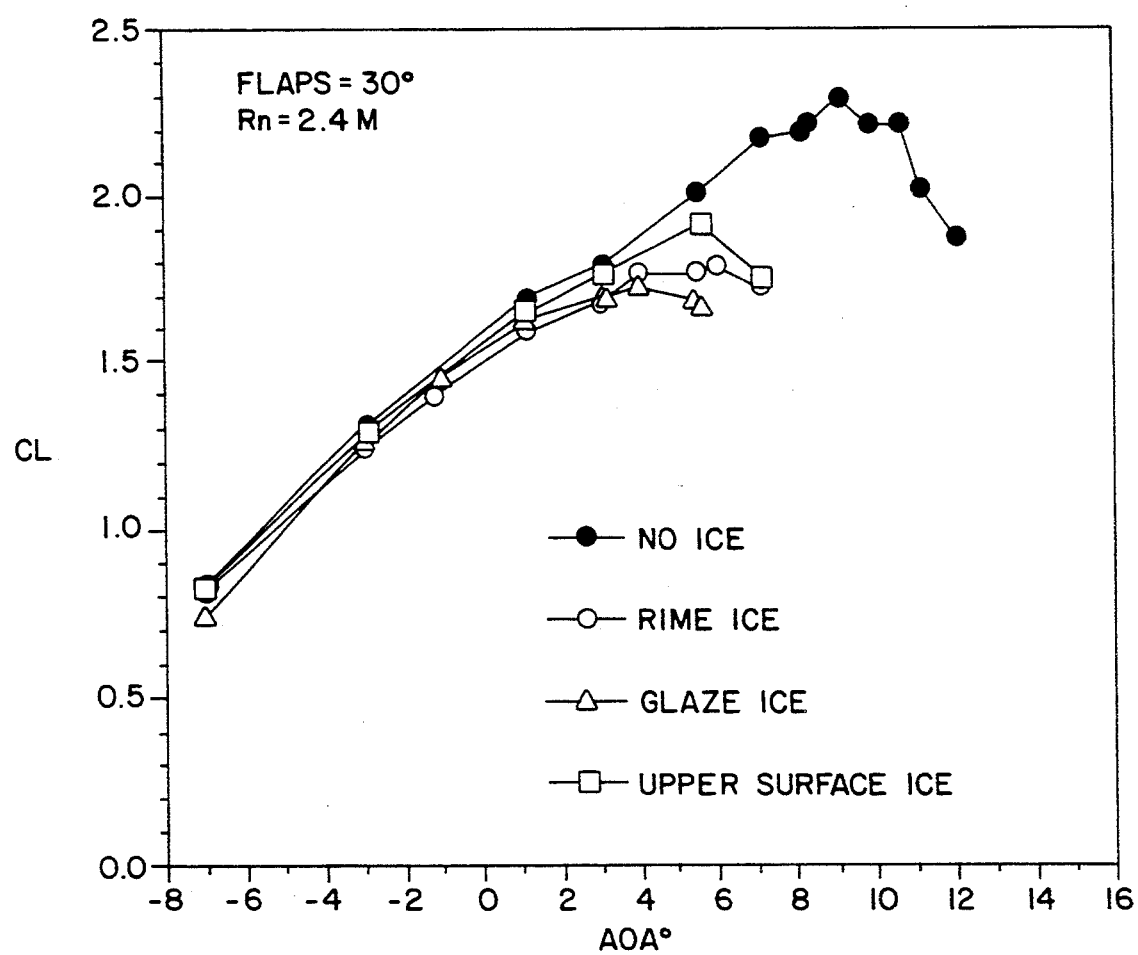
Figure 7:
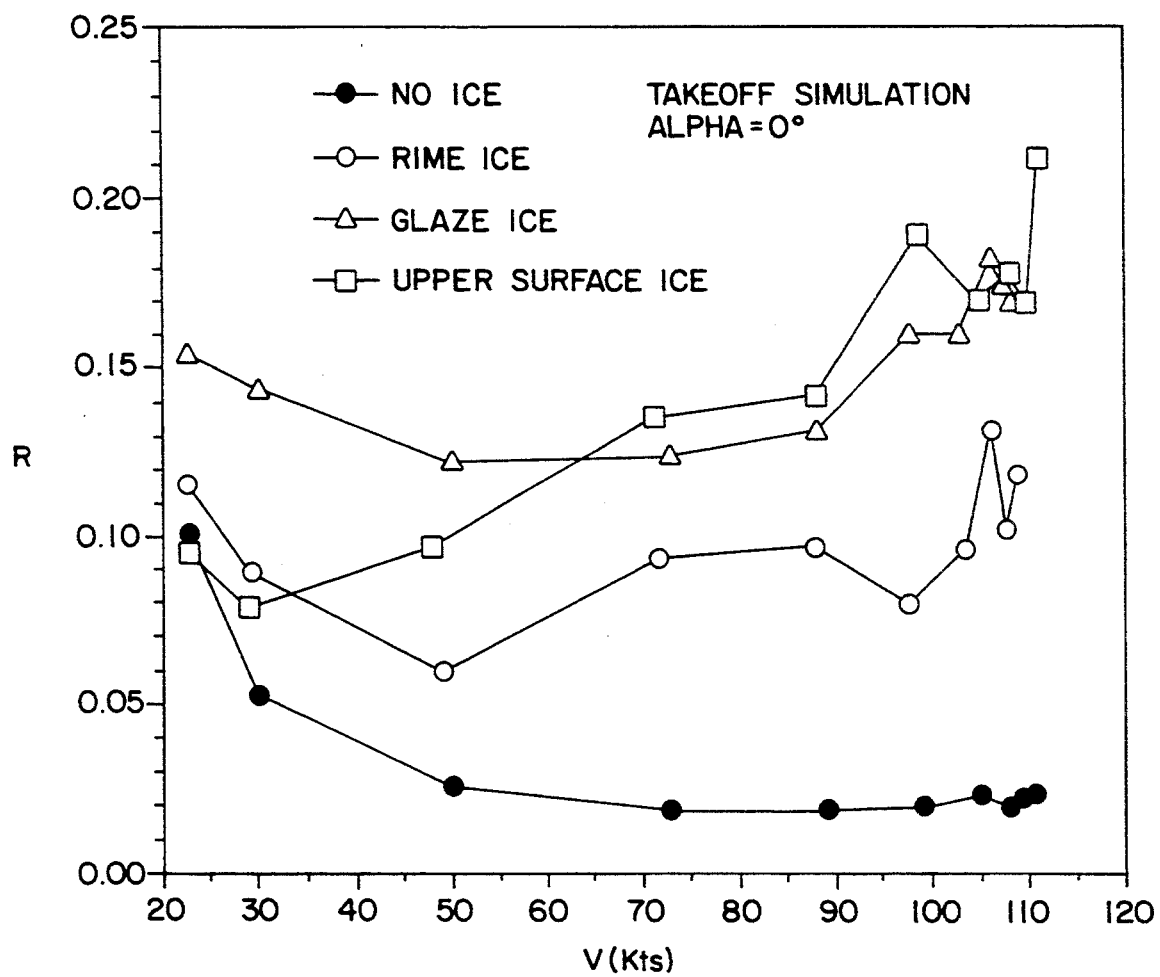
Figure 8:
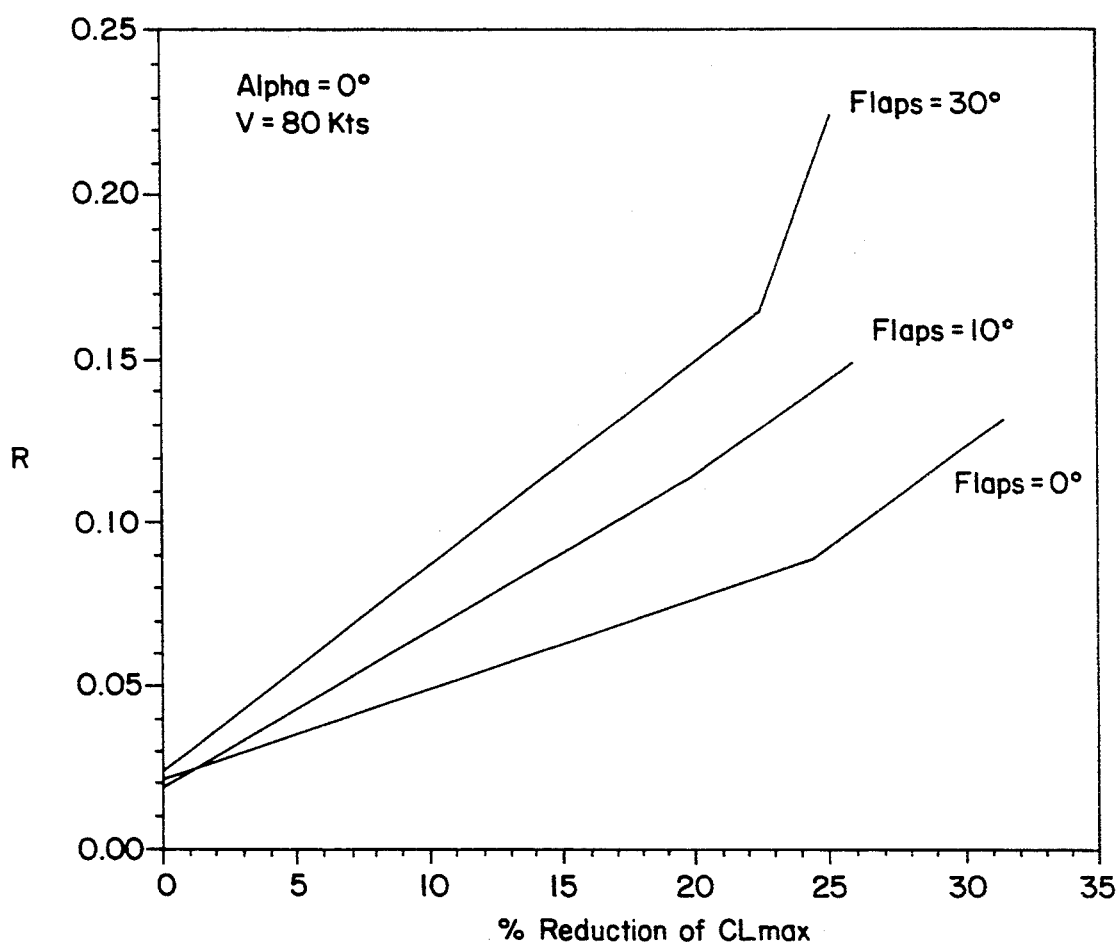
Figure 9:
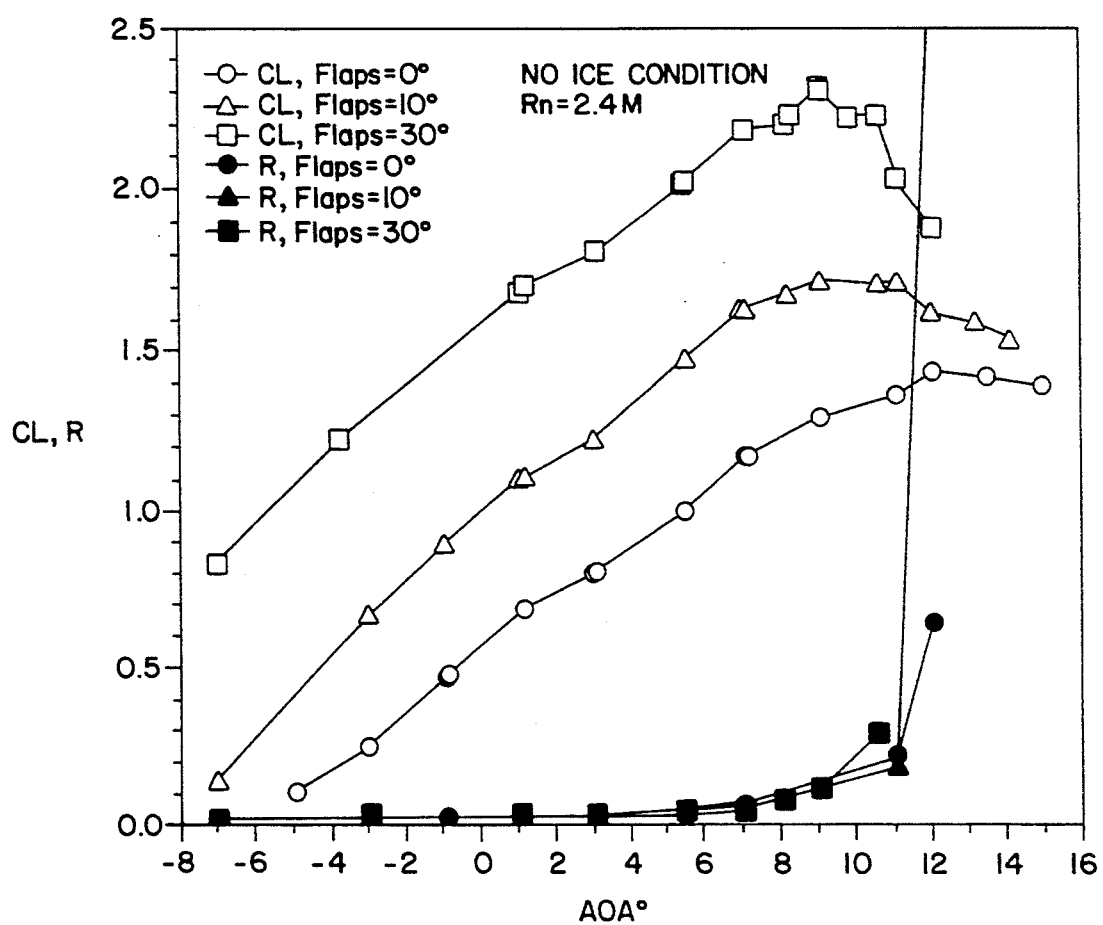
Figure 10:
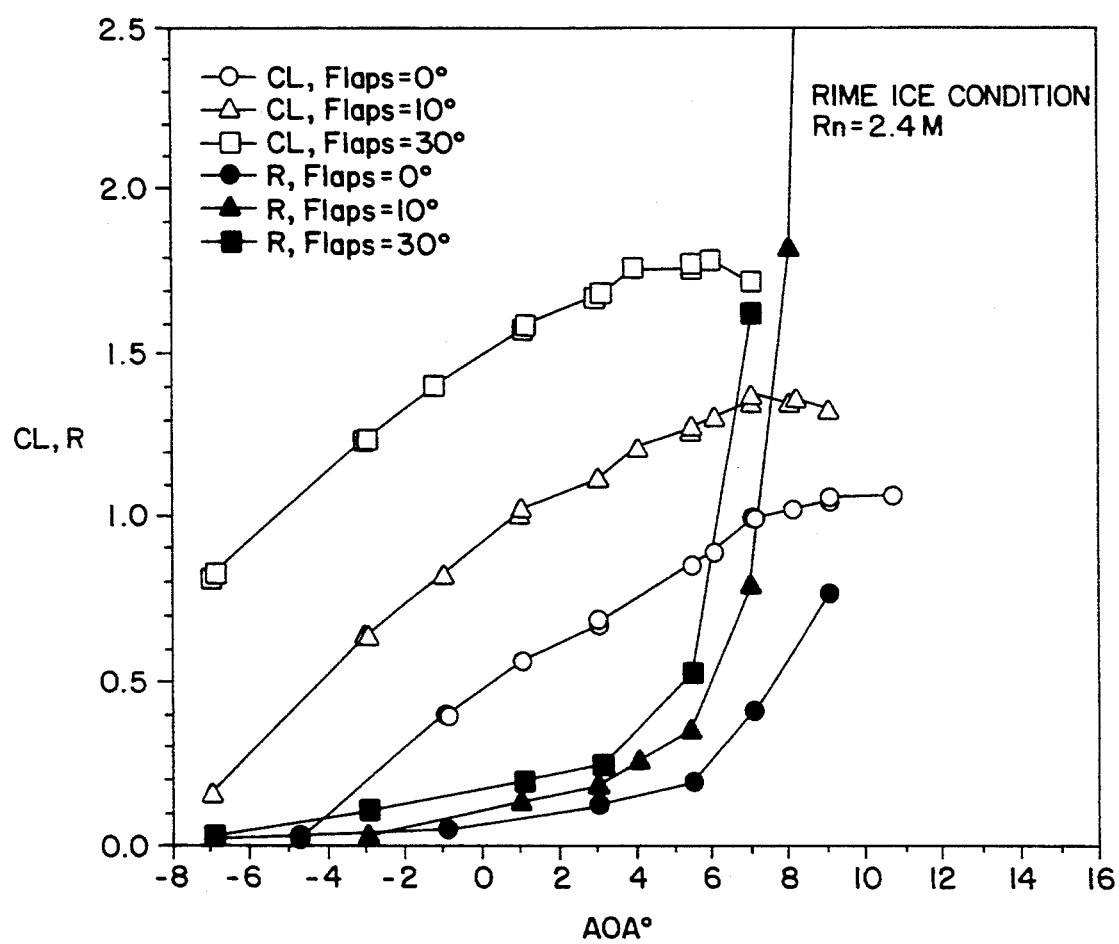
Figure 11:
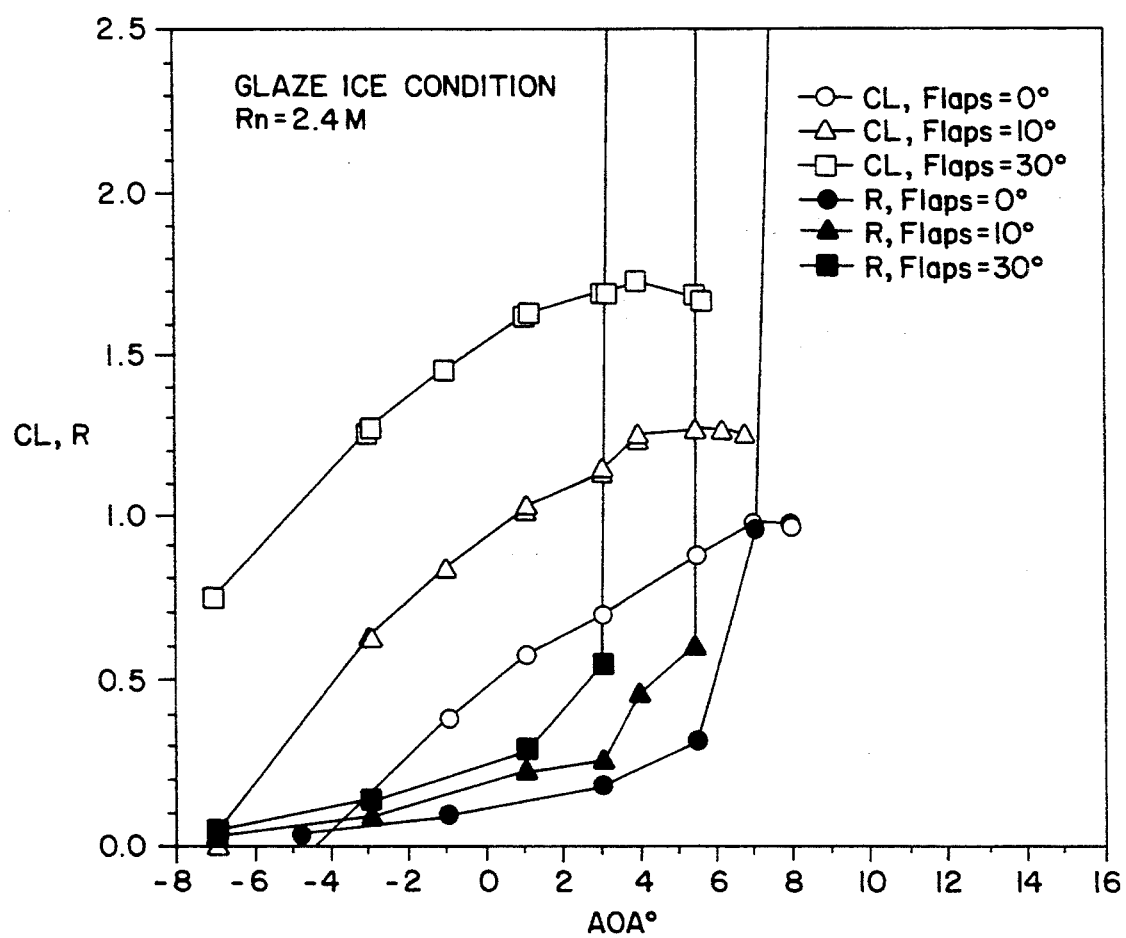
Figure 12:
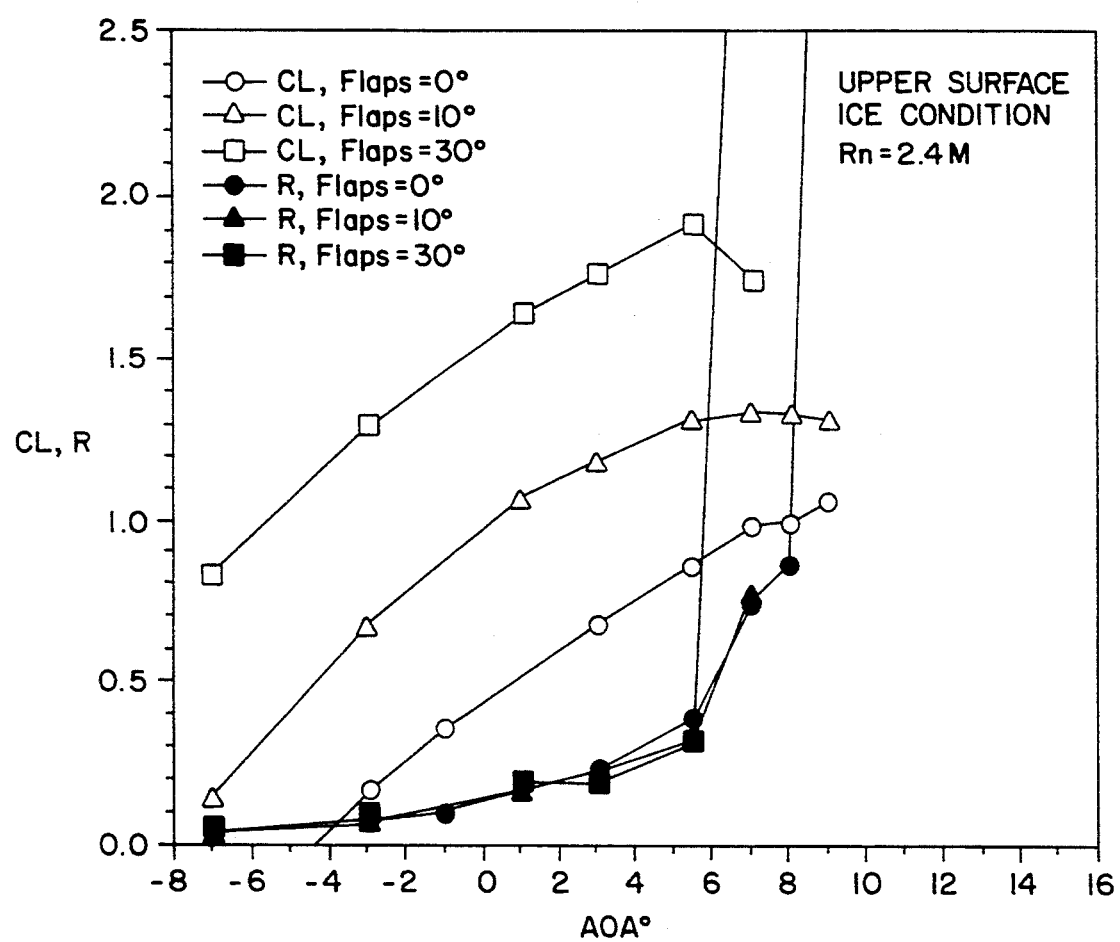

In FIGS. 1 to 3, numeral 10 generally indicates an natural laminar flow airfoil (wing), configurations of leading edge rime ice 12, leading edge glaze ice 14 and upper surface ice 16 are shown. FIGS. 4 to 6, show plots of CL (coefficient of lift) against AOA (angle of attach) in degrees, showing the airfoil lift curve for various airfoil conditions and flap angles. FIG. 7 shows measures R values as a function of airspeed during the take off ground roll, up to the point of rotation. The behaviour of the R parameter is very obviously sensitive to the presence of airfoil contamination. FIG. 8 illustrates the excellent correlation between the increasing R value and reduced maximum coefficient of lift (CLmax) caused by the contamination. FIGS. 9 to 12 measure CL and R against AOA (in degrees) for various flap deflections and airfoil ice configurations. Although not explicitly noted in the graphs, an excellent correlation is evident between the sharply increased R values and the critical angle of attack, under all icing conditions tested.

Figure 13:
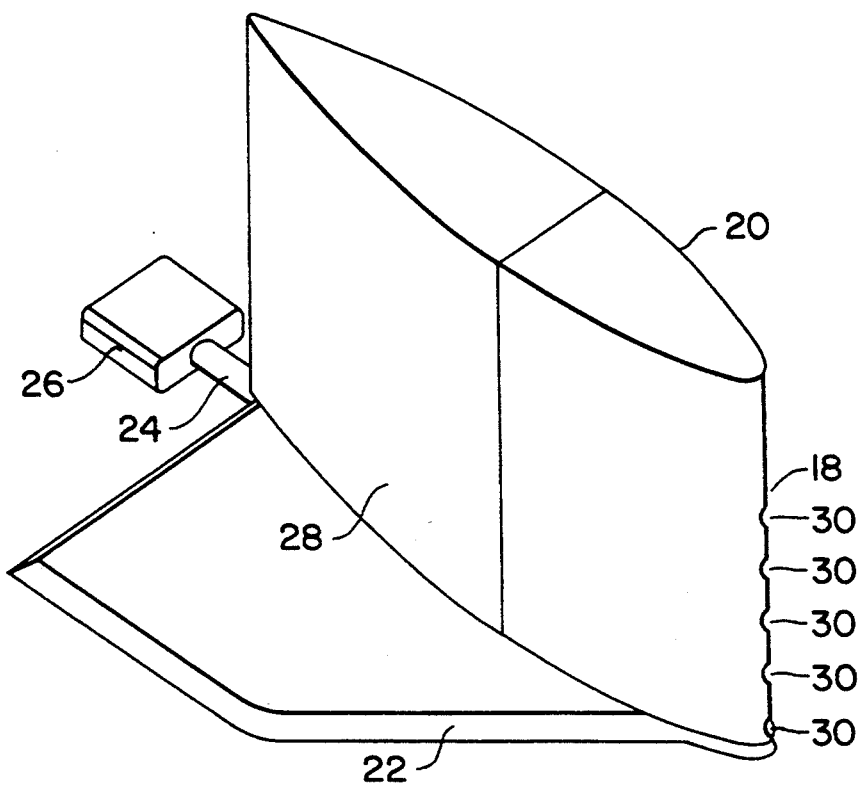
FIG. 13 shows an aerodynamic performance monitor of the invention.
Figure 14:
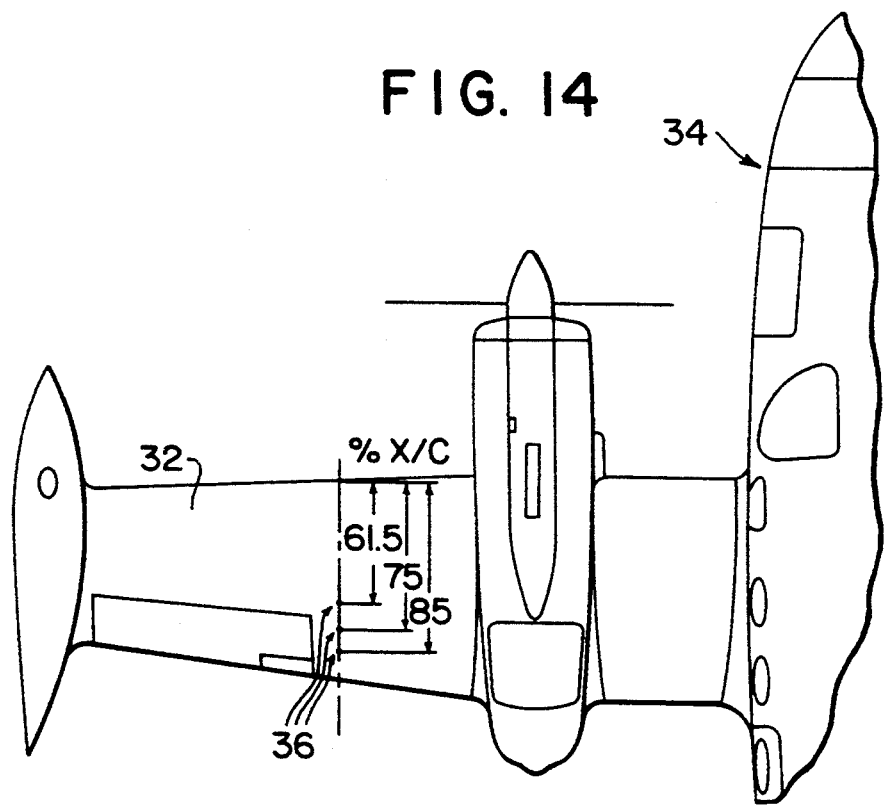
FIG. 14 shows locations of an aerodynamic performance monitor of the invention during flight tests.

In FIG. 13, an aerodynamic performance monitor (APM) is indicated by numeral 18, mast 20 was approximately 4 inches high by 5 inches long by 1.2 inches thick, it was mounted on flat base plate 22, 0.15 inches thick and extending 5 inches on either side of the mast, which was taped to the upper wing surface in a suitable position. Wires from the mast were led through pigtail connection 24 to fifty pin D connector 26 and thence to the aircraft fuselage. Two lateral 0.05 inch holes vent the mast interior, five frontal inlet tubes of size 5/32 inches at Z/C % (height Z above upper wing surface expressed as percentage of wing chord—the distance from leading edge to trailing edge of the wing) 0.5, 1.4, 2.3, 3.2 and 4.1, these inlets extended about ½ inch inward to the transducers. The inlet orifices are essentially identical in size to the pressure transducers, so the measured pressure approximates the external pressure, as would be realized by those skilled in the art. Two rod heaters were placed about 1 inch aft of the frontal inlets, controlled by a thermistor adjacent the front of the mast at the same height as vent holes 28. The temperature was maintained about 35° C. by the heaters which were 115 volt DC, 125 watt, about 0.25 inch diameter and 1.5 inch long, input power was limited to 20 amps. Two masts were placed on the Cessna 421B one on each wing. FIG. 14, shows wing 32 of aircraft 34, including monitor locations 36 at 61.5%, 75%, and 85% of chord. The masts were attached to the airfoil using aluminum tape attached to the mast base. As would be realized by those skilled in the art, the base may be fastened to the airfoil by any number of conventional fastening means, including, but not limited to, for example, adhesives, tapes, rivets, nuts and bolts, self tapping screws and the like. The mast itself can also be built into the airfoil.

Figure 25:
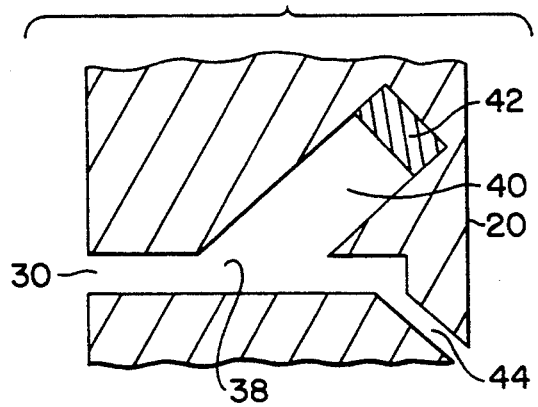
FIG. 25 shows an internal sectional view of the monitor of FIG. 13.

FIG. 25 indicates the general internal structure of mast 20, orifice 30 extends rearward as tube 38, inclined upward from tube 38 is passage 40, at the upper end of which is pressure transducer 42. This arrangement prevents direct impingement of precipitation onto pressure transducer 42. Rear vent or drain 44 is angled downward from tube 38 to allow drainage of impinging precipitation.

In practice only two transducers were present in each mast, the unused inlets being plugged. Transducers were tested at 0.5, 1.4, 2.3 and 3.2% of chord above the wing, most commonly at 1.4%.

Figure 26:
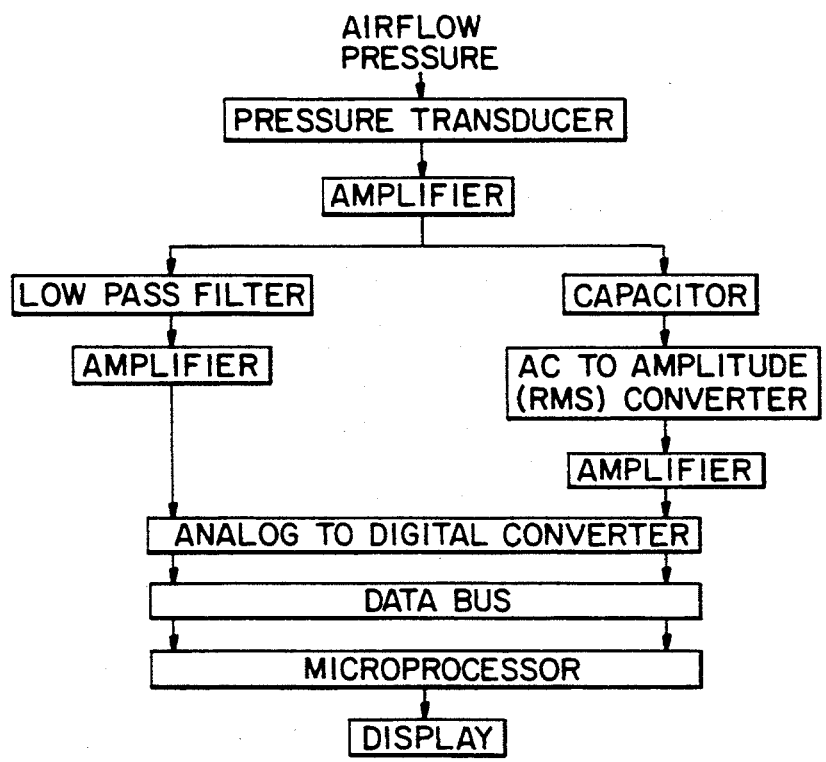
FIGS. 26, 27 show diagrams of component arrangements of the monitor.
Figure 27:
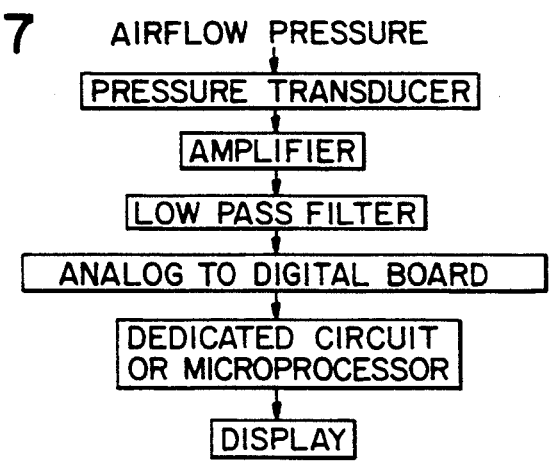

FIG. 26 diagrammatically shows analog electrical separation of the steady state and overlaid ripple components and derivation of the pressure turbulent intensity factor. The separated digital outputs are fed into the microprocessor, which generates the pressure turbulent intensity factor, and sends it to a display device. FIG. 27 diagrammatically shows digital electronic separation of the steady state and overlaid ripple components. The dedicated circuit or microprocessor separates and compares the combined digital signal and feeds a pressure turbulent intensity factor signal to the analog to digital board, which outputs to a display device.

The monitor system was first tested for vibration resistance and susceptibility to water ingestion. The system was unaffected by high vibration levels and rainfall rates equivalent to 19 inches/hour. In contrast, the airfoil being monitored suffered an approximate 4% loss of lift coefficient due to the rain, accompanied by a slight increase in turbulence and the R value. The R value correctly indicated the reduced stall margin under these conditions, which has hitherto been impossible.

In the flight tests HUD equipment was used to measure AOA, True Airspeed (TAS), roll and pitch angles, heading, aileron position, normal acceleration, longitudinal acceleration, and barometric altitude. The system discretes were updated every 200 milliseconds, except for the heading and altitude discretes which were updated every second. This data was fed into an Arinc 429 bus, and thence into a data acquisition computer, a CompuAdd 386-25 MHZ computer with 16 megabytes of memory and 110 megabyte hard drive.

The output from the transducers was amplified and frequencies greater than about 10 KHz filtered from the output using a low-pass filter. The output was differentiated so that 1 psi equalled 5 volts output. The output was then fed into an analog to digital board within the data acquisition computer. The steady state component was separated from the overlaid component using a high-pass or notch filter, the latter being transformed into a root mean square (RMS) component. The resulting filtered components may be compared directly or as linear, logarithmic, hyperbolic, exponential, or polynomial functions. The transformed ripple component is then divided by the steady state component to give the dimensionless number R, with an output of 1 volt when the two components are equal. This pressure derived dimensionless number R is not the same as the airspeed derived dimensionless number R. Preset thresholds of the R value can be used to indicate boundary layer transition, critical angle of attack, and critical Mach number. Similar computer logic circuits and boards are utilized to those taught in U.S. Pat. No. 4,649,387, which are representative of any general purpose microprocessor controlled signal processor).

Figure 15:
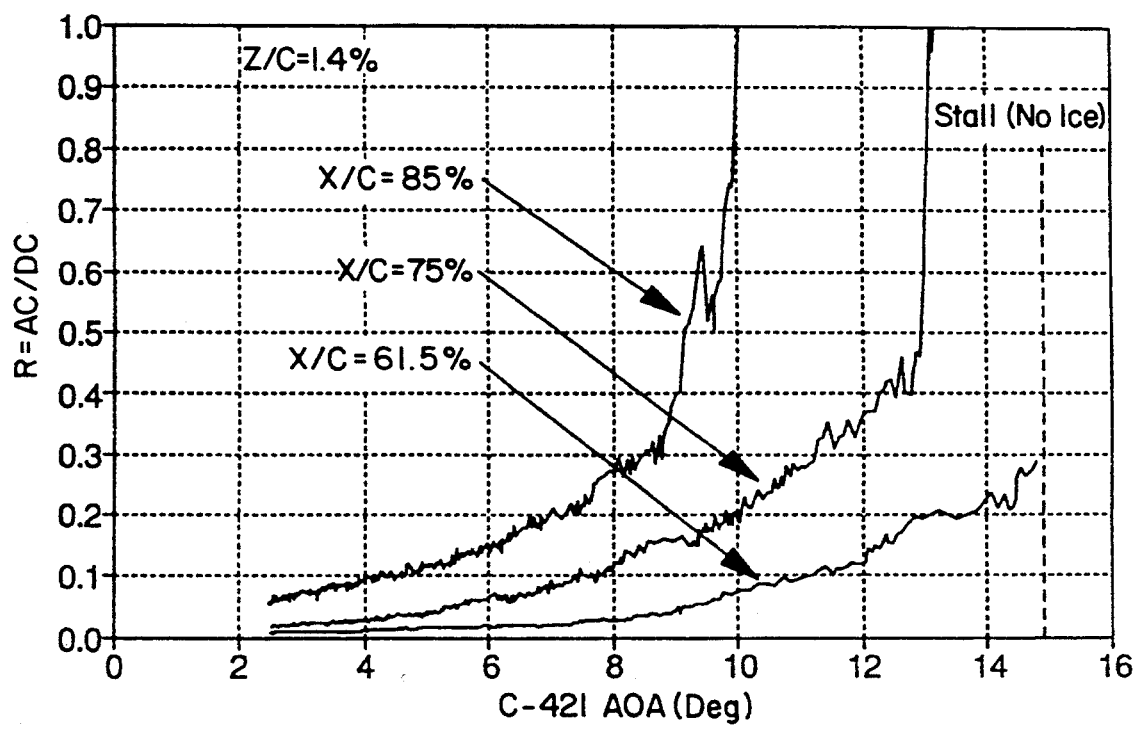
FIGS. 15 to 24 present graphically tests results obtained using the monitor of FIG. 13 under flight conditions.
Figure 16:
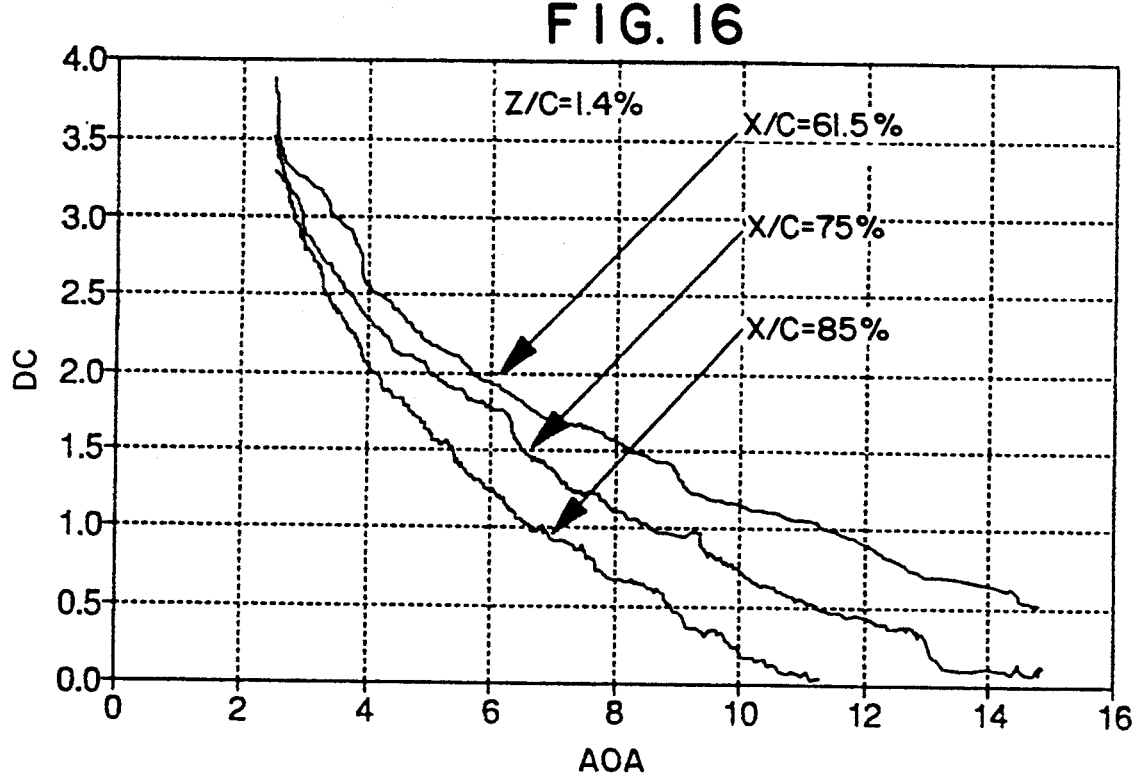
Figure 17:
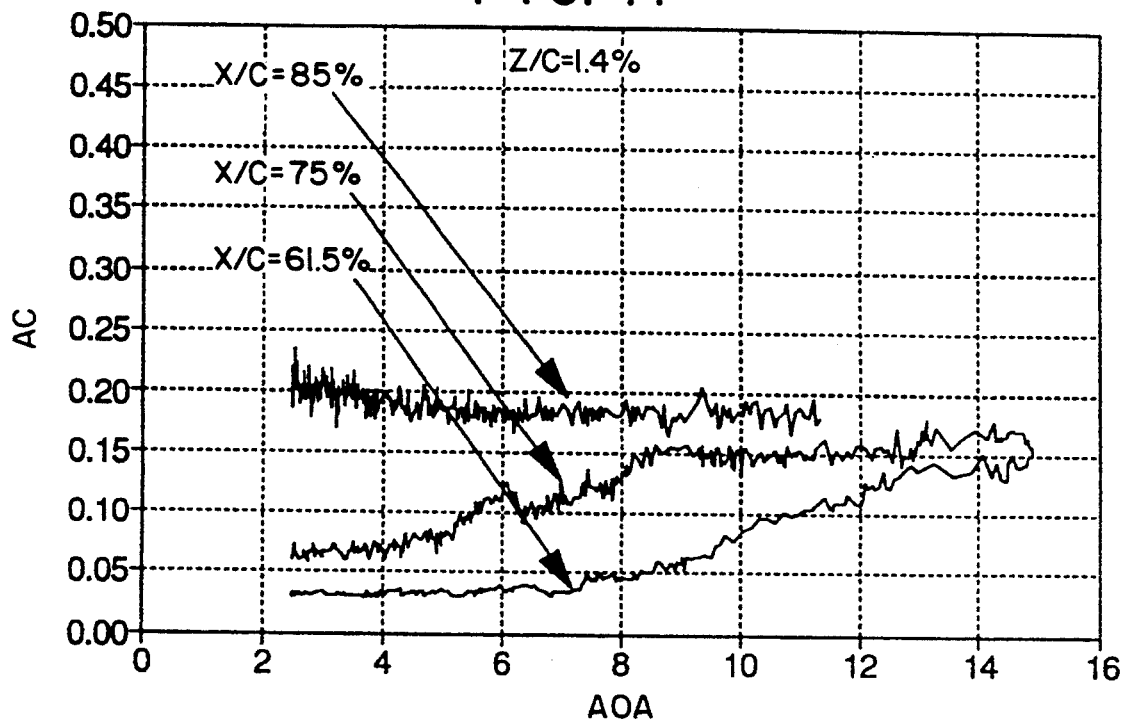

FIG. 15 shows the dimensionless number R derived from the transformed digitalized AC component divided by the digitalized DC component plotted against angle of attach (AoA). The values are measured at 61.5%, 75% and 85% of wing chord. As can be seen the 75% and 85% chord locations yield an off-scale R value prior to the aerodynamic stall, which indicates excessive sensitivity to lift coefficient changes. FIG. 16 shows the behavior of the digitized DC component used to generate the R value, as a function of AoA. The 75% and 85% of chord digitized DC component declines to zero before stall at about 15° AoA, which causes excessive noise in the R signal at these locations. FIG. 17 shows the transformed digitized AC component (as RMS) against AoA. At 85% of chord this component is more or less constant, while at 75% of chord it increases with AoA to a constant value at about 8°, only at 61.5% of chord does it increase to the stall. The explanation believed by those skilled in the art is that there is a region of separated flow near the trailing edge of the wing that deepens and progresses forward as the AOA increases. The pressure sensors are exposed to this separated flow when located aft on the chord-line at relatively low distances from the airfoil surface. The resulting increase in noise levels can be offset by choosing a higher probe location or one further forward on the wing. The optimum sensor location yields the highest signal to noise ratio and steepest slope of the R vs CL curve.

Figure 18:
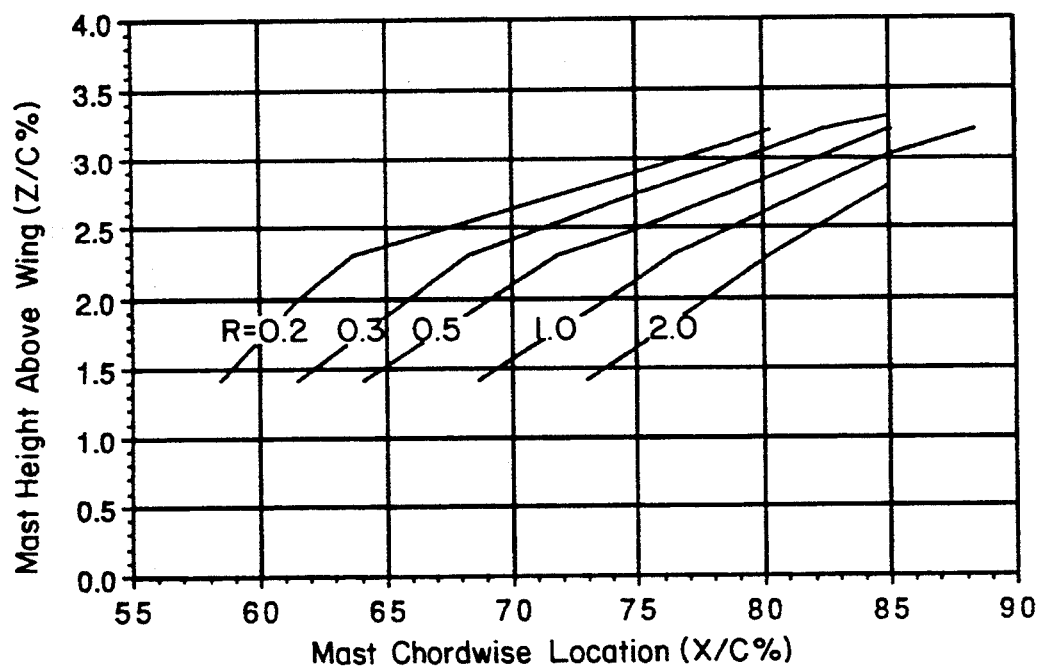

FIG. 18 shows the dramatic increase in turbulence ratio at low/rearward probe locations.

Figure 19:
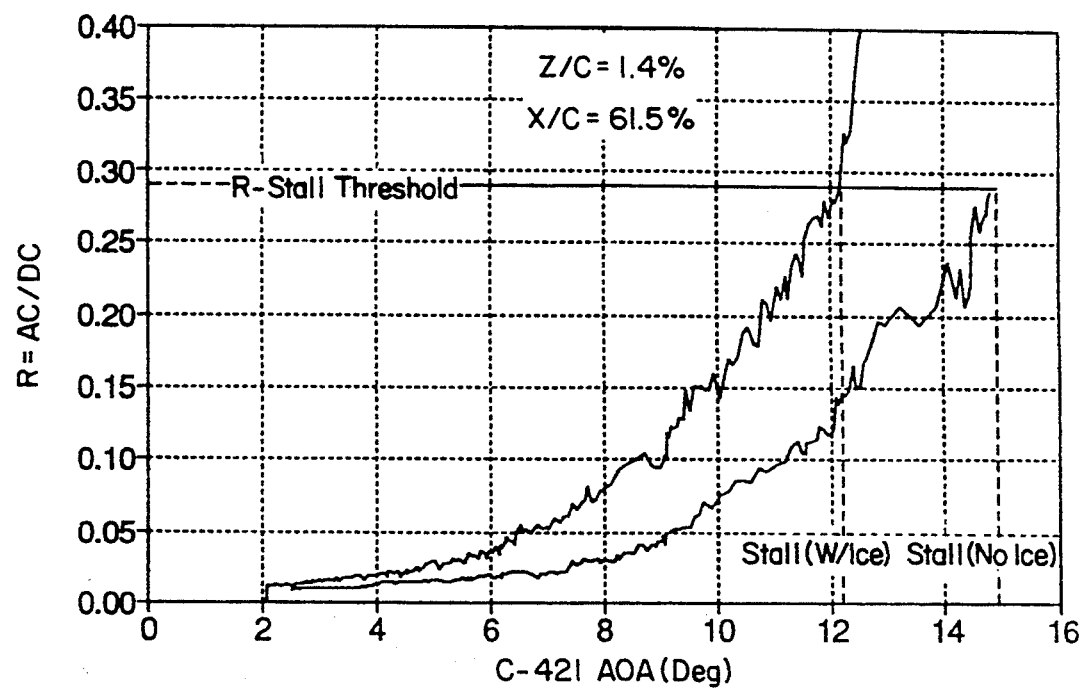
Figure 20:
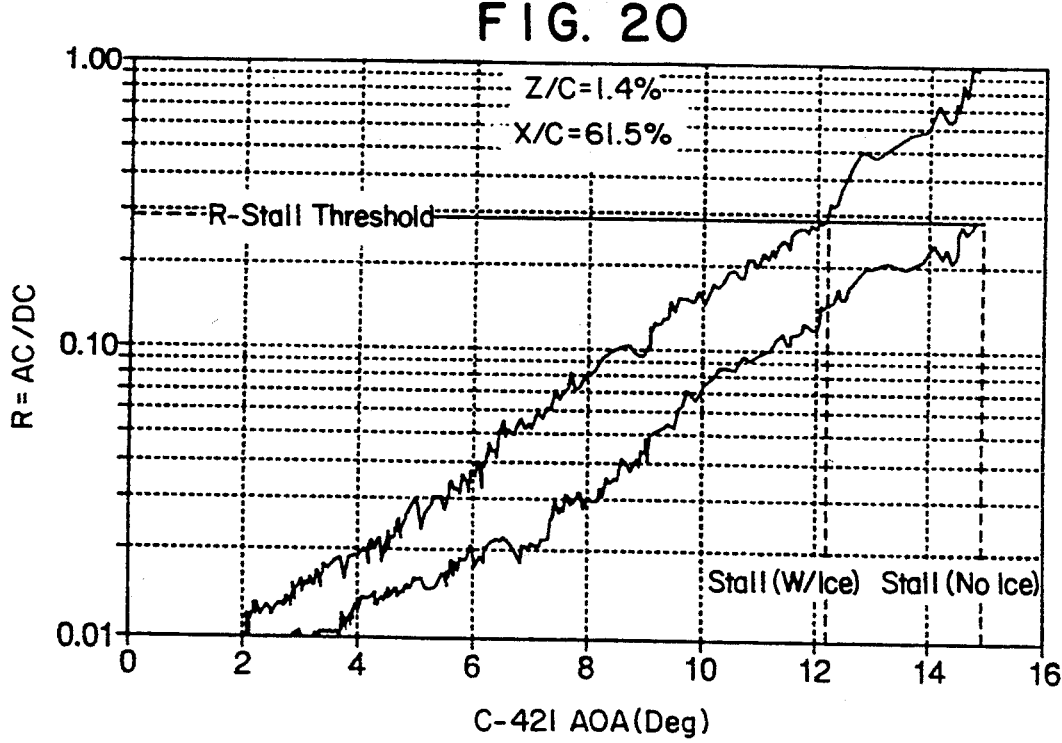
Figure 21:
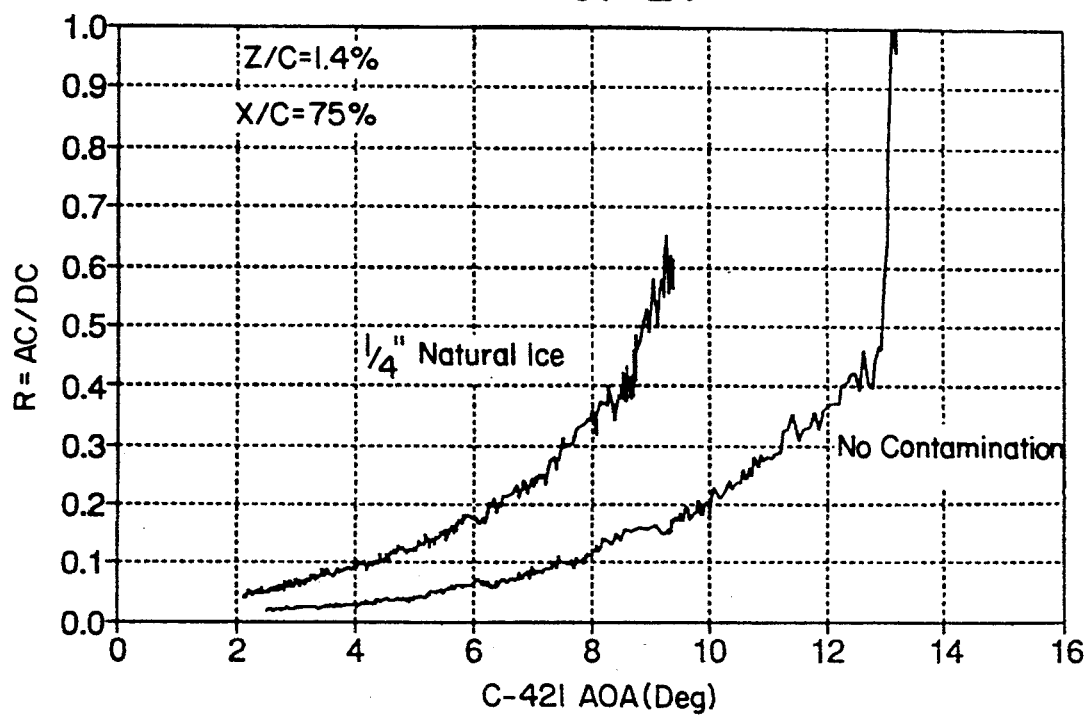
Figure 22:
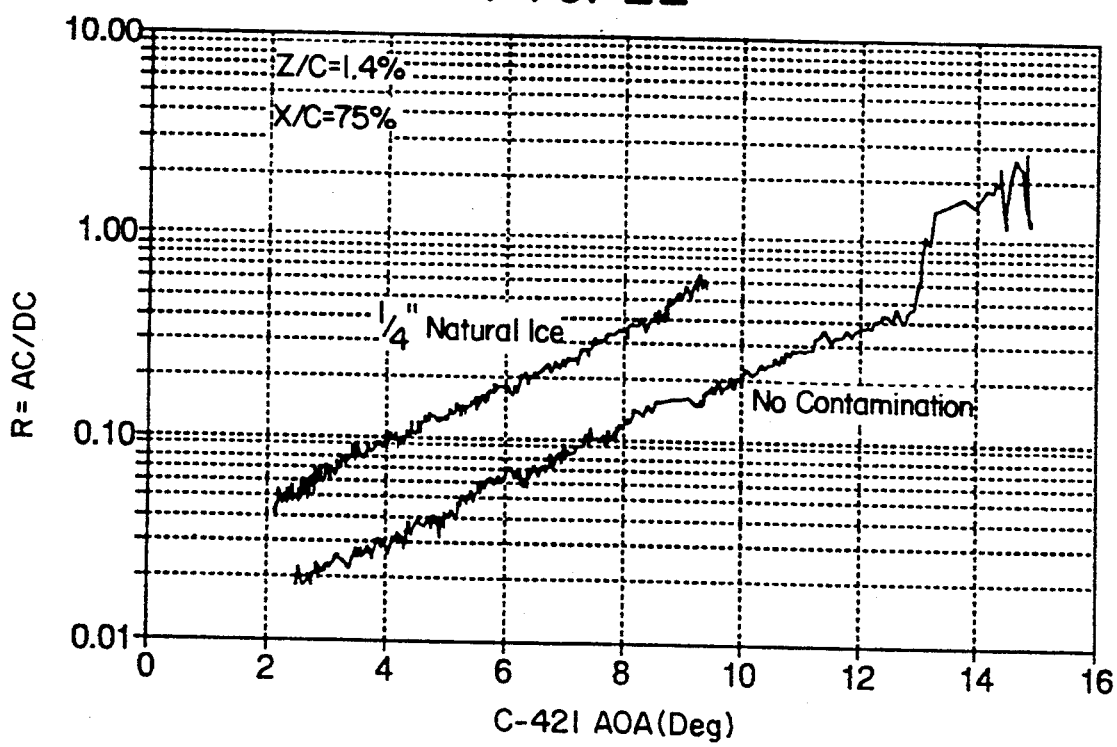

FIGS. 19 and 20 show the effects of approximately 0.5 inch of simulated rough rime leading edge ice on the R/CL curve obtained from a probe mounted at 61.5% of chord, using linear and logarithmic axes. FIGS. 21 and 22 similarly show the effects of approximately 0.25 inch of natural ice on the R/CL curve. In both cases the logarithmic data form straight lines, although full stall was not achieved in either configuration because of safety considerations.

Figure 23:
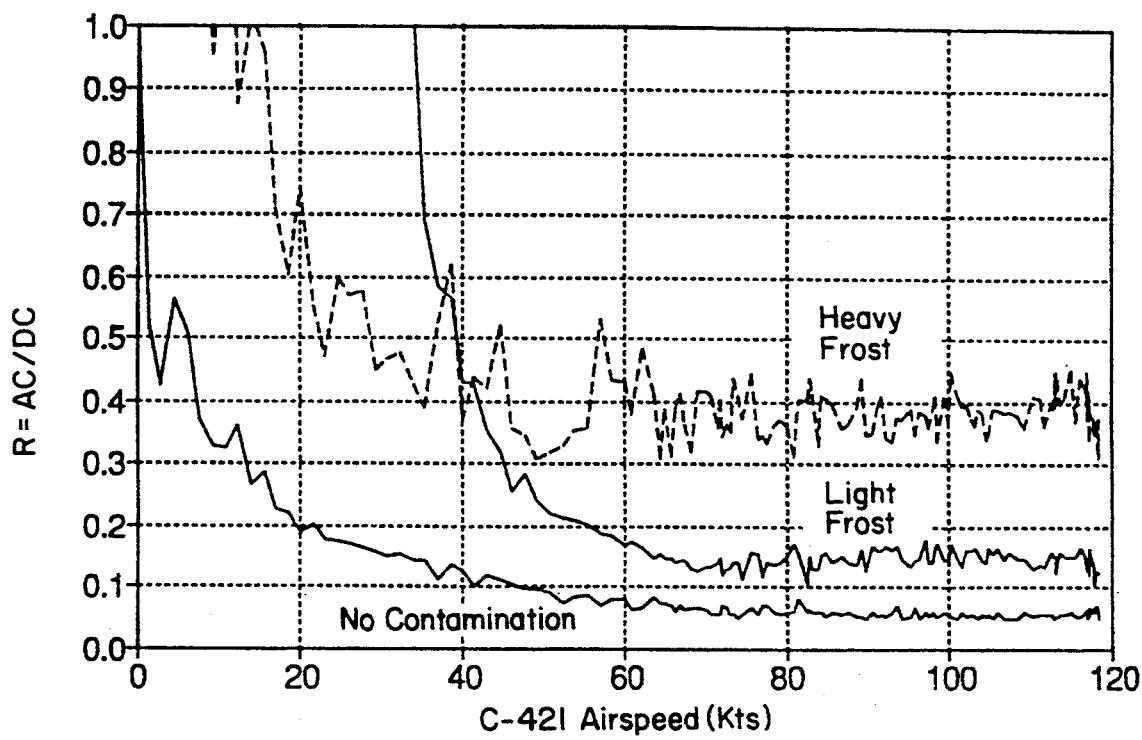
Figure 24:
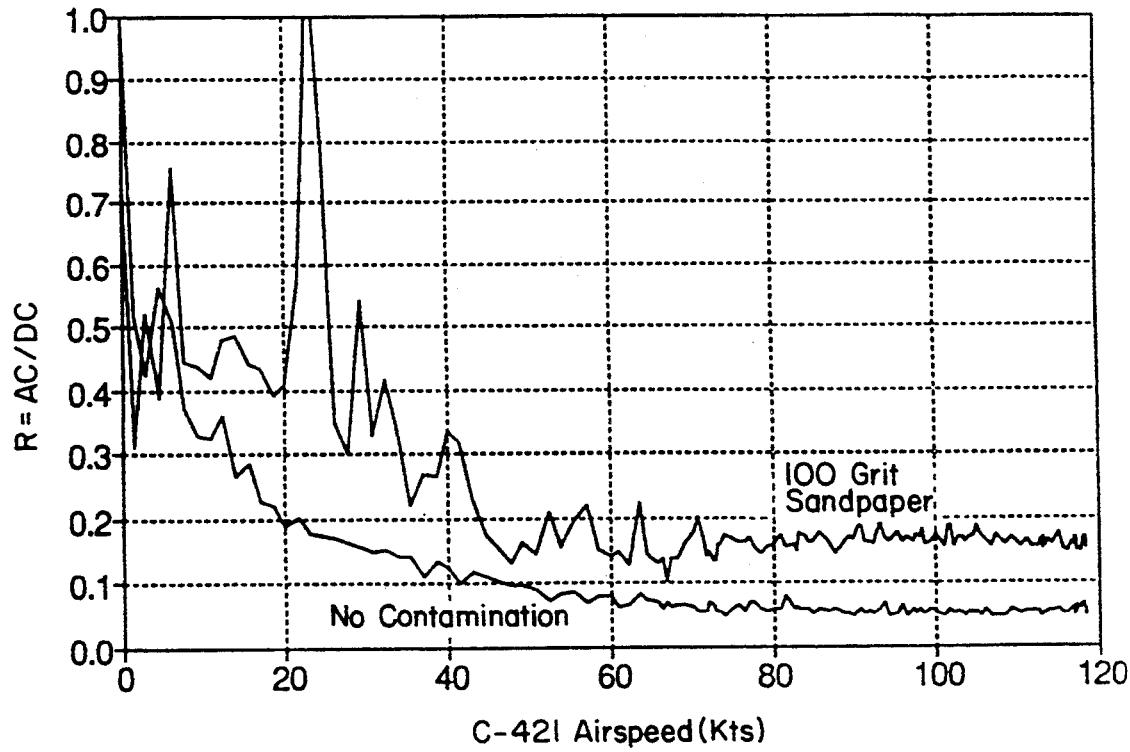

FIGS. 23 and 24 show R values against airspeed during takeoff with simulated contamination (100 grit sandpaper), and light frost and heavy frost comprising ice pellets 0.25 to 0.5 inch diameter, and 0.1 to 0.125 inch high. The probe was located at 75% chord and 1.4% height, the R values were significantly higher when contamination was present.

Although these R values were determined for a specific aircraft model, those skilled in the art could routinely determine suitable monitor locations and transducer heights and indicative R values for any given airfoil. Desirably the R value sued would be that with the highest sensitivity, (greatest slope, linear or logarithmic, when plotted against AoA), which would reasonably be expected to vary by airfoil.

As those skilled in the art would realise these preferred illustrated dimensions, details and components can be subjected to substantial variation, modification, change, alteration, and substitution without affecting or modifying the function of the illustrated embodiments. Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. In a method investigating airflow over the external surface of an airfoil comprising
    measuring at least one parameter of said airflow in real-time to produce a signal,
    identifying and measuring the steady state component of said signal,
    identifying and measuring the overlaid ripple component of said signal,
    expressing said components of said signal as a dimensionless ratio, to produce a turbulence intensity factor,
    the improvement comprising measuring the pressure of said airflow to produce a pressure turbulence intensity factor.

2. A method of claim 1, additionally comprising transforming said real-time overlaid ripple component of said signal into an amplitude equivalent.

3. A method of claim 2, additionally comprising presenting said pressure turbulence intensity factor by conventional means.

4. A method of claim 1 comprising
    measuring the real-time pressure of said airflow using pressure transducer means to produce an analog output signal,
    transforming said output signal from analog signal to digital signal,
    separating said digital signal into steady state and overlaid ripple components,
    transforming said overlaid ripple component into an amplitude equivalent
    expressing a dimensionless ratio of said amplitude equivalent of said overlaid ripple component and said steady state component to produce a pressure turbulence intensity factor.

5. A method of claim 4, additionally comprising amplifying said analog output signal, and
    presenting said pressure turbulence intensity factor by conventional means.

6. A method of claim 1 comprising
    measuring the real-time pressure of said airflow using pressure transducer means to produce an analog output signal,
    separating said analog output signal into steady state and overlaid ripple components,
    transforming said overlaid ripple component into an amplitude equivalent
    expressing a dimensionless ratio of said amplitude equivalent of said overlaid ripple component and said steady state component to produce a pressure turbulence intensity factor.

7. A method of claim 6, additionally comprising amplifying said analog output signal, and
    presenting said pressure turbulence intensity factor by conventional means.

8. Apparatus for investigating airflow over the external surface of an airfoil comprising:
    means to measure pressure in real-time at a predetermined location spaced from said surface
    means to produce at least one output signal corresponding to said pressure,
    means to separate said signal into steady state and overlaid ripple components
    means to derive a dimensionless ratio of said overlaid ripple component and said steady state component to produce a pressure turbulence intensity factor.

9. An apparatus of claim 8, additionally comprising means to transform said real-time overlaid ripple component of said signal into an amplitude equivalent.

10. An apparatus of claim 9, additionally comprising conventional means to display said ratio.

11. Apparatus of claim 8 comprising
    means to measure pressure in real-time at a predetermined location spaced from said surface
    means to produce at least one output signal corresponding to said pressure,
    means to convert said output signal from analog to digital, means to separate said digital signal into steady state and overlaid ripple components means to transform said overlaid ripple component into an amplitude equivalent, means to derive a dimensionless ratio of amplitude equivalent of said overlaid ripple component and said steady state component to produce a pressure turbulence intensity factor.

12. An apparatus of claim 11, additionally comprising means to amplify said output signal and conventional means to display said ratio.

13. Apparatus of claim 8 comprising means to measure pressure in real-time at a predetermined location spaced from said surface means to produce at least one output signal corresponding to said pressure, means to separate said signal electrically into steady state and overlaid ripple components means to transform said overlaid ripple component into an amplitude equivalent, means to derive a dimensionless ratio of amplitude equivalent of said overlaid ripple component and said steady state component to produce a pressure turbulence intensity factor.

14. An apparatus of claim 13, additionally comprising means to amplify said output signal and conventional means to present said ratio.

* * * * *

UNITED STATES PATENT AND TRADEMARK OFFICE
CERTIFICATE OF CORRECTION

PATENT : 5,341,677

DATED : August 30, 1994

INVENTOR(S) : John M. Maris

It is certified that error appears in the above-identified patent and that said Letters Patent is hereby corrected as shown below:

```
Col 5, l.52 --Alteratively-- should read --Alternatively--
Col 7, l.9, --attach-- should read --attack--
Col 9, l.41, --sued-- should read --used--.
```

Signed and Sealed this

Eighth Day of November, 1994

Attest:

BRUCE LEHMAN

*Attesting Officer*     *Commissioner of Patents and Trademarks*